United States Patent [19]

Fotioo

[11] Patent Number: 5,205,626

[45] Date of Patent: Apr. 27, 1993

[54] HANGING FILE SYSTEM

[75] Inventor: Bobby Fotioo, Helena, Ark.

[73] Assignee: B & L Products, Inc., Helena, Ark.

[21] Appl. No.: 867,343

[22] Filed: Apr. 13, 1992

[51] Int. Cl.$^5$ .......................... B42F 15/00; F16B 9/00
[52] U.S. Cl. ...................................... 312/184; 211/46; 211/189; 403/205; 403/403
[58] Field of Search .................. 312/184, 193; 211/46, 211/189; 403/205, 402, 403

[56] References Cited

U.S. PATENT DOCUMENTS

| | | | |
|---|---|---|---|
| 3,999,663 | 12/1976 | Walter et al. | 312/184 X |
| 4,030,610 | 6/1977 | Alexander | 211/189 X |
| 4,091,933 | 5/1978 | Alexander | 312/184 X |
| 4,176,753 | 12/1979 | Godfrey | 312/184 X |
| 4,526,277 | 7/1985 | Snowden et al. | 312/184 X |
| 4,636,105 | 1/1987 | Johansson | 403/205 |
| 5,060,808 | 10/1991 | Engman | 211/189 X |

FOREIGN PATENT DOCUMENTS

| | | | |
|---|---|---|---|
| 684401 | 1/1967 | Belgium | 403/205 |
| 3001706 | 7/1981 | Fed. Rep. of Germany | 403/205 |

*Primary Examiner*—Lloyd A. Gall
*Attorney, Agent, or Firm*—Stephen D. Carver; J. L. Mahurin

[57] ABSTRACT

A hanging file frame system adapted to accommodate conventional hanging file folders comprising two side rails, two cross member rods and two hoops joined together by four modular joint supports. The side rails are of relatively flat stock with a plurality of breakaway notches in one end. The cross members and the hoops are formed from round bar stock of the same diameter. The cross members are round bar stock of a predetermined length. The hoops are bent from a single piece of stock forming a foot section, uprights at either end of the foot section, two terminating horizontal tangs and barbs on each tang. The modular joint supports are interchangeable and constructed of a resilient but somewhat flexible plastic. The supports comprise minor bosses in a horizonal orientation whenever the hanging file frame is assembled with internal keyways running parallel with the central axis of the minor bosses, and a major boss formed in the side of the support. The barbs on the tangs of the hoops are matched or timed to the keyways. When the tang is inserted into the minor boss, it locks preventing rotation of the hoop and collapse of the system.

20 Claims, 4 Drawing Sheets

HANGING FILE SYSTEM

BACKGROUND OF THE INVENTION

1. Field of the Invention

The present invention broadly relates to hanging file systems for desk drawers or the like. More particularly, it relates to an improved hanging file system and a kit for erecting the system that includes a frame adapted to be varied in length and width for holding conventional letter size or legal size hanging files in desk drawers. The field of the invention includes U.S. Classes 211, Subclasses 182, 183, 191, 204, 206 and Class 312, Subclass 184.

2. Description of the Prior Art

Hanging file folder frames are well known in the art. A variety of forms and configurations exist. Such frames may be integrated into original equipment drawers, or they may be retrofitted to existing equipment.

The primary disadvantages of most previous hanging file folders systems is a lack of stability or, conversely rigidity, either of which makes the handling of heavy files difficult for the frame to structurally sustain. Bojarn U.S. Pat. No. 3,788,718 discloses a rigid frame with slip button type connection means for attaching the sides and the ends together. It is constructed of plastic and is of fixed dimensions. Barber U.S. Pat. No. 4,312,453 discloses a file hanging system employing two "U" shaped brackets and "U" shaped grooves in which the two "U" shaped brackets may travel. Broek U.S. Pat. No. 4,658,966 discloses a hanging file system for blueprints and such. It comprises a frame to be attached to the blue print to be hung and wall brackets mounting a rod which mates with the frame of the blueprint.

U.S. Pat. No. 4,726,635 issued to Rariden for a hanging file folder support assembly is comprised of bars to be disposed in drawers at right angles to one another. The side bars of this system are secured within the drawer. Goedken discloses in U.S. Pat. No. 4,887,873 a file system which includes rails which have a camming surface at their forward end to engage a slot on the inside surface of the front wall of the drawer. The rail further extends rearward and has a downward extending leg.

U.S. Pat. No. 3,944,080 issued to Hansen Mar. 16, 1976, discloses a structure for supporting hanging file folders. The structure includes a pair of side rail wire members attached to solid plates which are attached or formed from the ends of the file drawer. U.S. Pat. No. 4,236,770 issued to Moore Dec. 2, 1980 discloses a device to be inserted on the ends of hanging file folders to allow them to slide more easily along the bars of the systems such as those disclosed in the above patents.

The above mentioned patents disclose either rigid systems some of which require special slots or holes in the drawers themselves. While these systems can support a great deal of weight they are not removable. Further, when they do fail they break suddenly and completely result in disorganization of files and a need to completely replace, at least the file hanging system, if not the structure of the file drawer itself.

Other patents have disclosed hanging file frames which are more self contained and which provide a more flexible structure. Alexander U.S. Pat. No. 4,049,127 discloses a frame which is primarily comprised of side rails, cross-members and a pair of legs. The rails are joined to the cross-members and the legs by corner fittings. The corner fittings in this patent are "U" shaped allowing the side rails to slide forward and rearward through the fittings. U.S. Pat. No. 4,030,610 also issued to Alexander discloses a structure fairly similar to his previous cited patent. The hanging file frame includes rails, two cross-members and four downward extending legs. The components are joined at each corner by corner fitting of strong plastic. These corner fittings allow the side rails to slide forward and rearward while holding the legs and the cross-members rigid.

Godfrey U.S. Pat. No. 4,176,753 discloses a hanging file support frame once again with two side rails, two cross-members, and two downward extending leg assemblies. These components are joined at the corners by four corner fittings which also allow the side rails to slide forward and rearward and which allow the side rails to be inserted in the bracket through the outer face of the bracket. The cross members in this structure are hollow. Alexander holds a third patent on hanging file supports, U.S. Pat. No. 4,091,933. This patent discloses a hanging file system having two end legs, two cross-members, and two side rails, as well as four corner supports. The legs and the cross members enter the corner supports at right angles to one another while the side rails are constructed in such a manner that they mate with the outer surfaces of the corner supports. Also, the corner supports have biased hooked portions formed into their outer surface which allow the rails to slide upon the fittings. These side rails can slide from front to rear.

Many known prior art hanging file suspension systems have side rails, cross members and end support legs held together by corner supports made of plastic. However, most lack the structural and assembly advantages present in the instant invention. For example, typical prior art devices allow the rail to slide through a corner fitting. This results in instability and, a system which tends to fail with time and wear. Furthermore, the above patents disclose corner brackets which require that the end support legs be inserted in a vertical position. This allows the legs to fall out and, results in a small surface area upon which the weight of the file folders are supported, namely the cross section of the support leg itself.

The present invention overcomes these disadvantages by inserting the end support legs horizontally into modular joint supports and locking them in place. Furthermore, the side rails are fixed in a blind-ended slot to prevent them from sliding rearward or forward or twisting out to the sides. The net effect of these two innovations is a hanging file frame which is structurally stronger in its corner joints without being overly rigid while providing support legs which may flex to rest against the end corners of the file drawer.

SUMMARY OF THE INVENTION

My hanging file frame system consists of a plurality of orthogonally interconnected frame members held together by special plastic fittings. The system, optionally in the form of a kit, can be deployed by the user without special tools, and it is self adapting to drawers of different sizes. The system is generally comprised of two side rails, two crossmember rods and two hoops joined together by a selected group of four modular joint supports.

In the best mode the side rails are made of relatively flat stock with a plurality of notches defined in one end.

These notches allow the side rail length to be adjusted as necessary for a particular application by breaking away a portion of the side rail with a pair of pliers. The cross members and the hoops are formed from round bar stock of the same diameter. The cross members are simple pieces of round bar stock of a predetermined length. The hoops are each bent from a single piece of stock forming a foot section, upright, and integral legs at either end of the foot section. The legs terminate in outwardly turned, horizontal tangs adapted to be disposed parallel with the cross members.

Corners of the system are established by modular joint supports, into which the rails, the cross members and the hoops are fitted. These preferably molded plastic supports are interchangeable. Joint support configuration is dictated by the size, legal or letter, of the file frame. Both types of supports have major features in common including, minor bosses with keyways disposed on the interior walls and an elongated major boss formed on the side of the support. Preferably the modular joint supports are constructed of a resilient but somewhat flexible plastic.

The minor bosses cavities are in a horizontal orientation whenever the hanging file frame is assembled. The keyways run parallel with the central axis of the minor bosses but perpendicular to the major boss formed in the side of the body. Preferably the hoop leg tangs are barbed to register with the keyways.

The major boss is disposed on the side of the body perpendicularly to the minor bosses in two planes. The interior being of a length approximating the width of the side rails.

Since each minor boss has the timed keyways in its walls the modular joint supports of the same size are interchangeable. So, to assemble the hanging file frame, one simply inserts the tang of a hoop into a minor boss of a modular joint support, aligning the barbs and the keyways, insert the cross member into the other minor boss and a side rail into the major boss. The process is repeated for each corner. When the tang is inserted into the minor boss, it locks preventing rotation. So, the hoops will not rotate and allow the file frame to sag but will rather remain upright. Additionally, the horizontal orientation of the hoop's connection with the file frame structure provides the system a relatively large surface area, the dorsal area of the tang, on which to bear.

Thus a broad object of the present invention is to provide an easy-to-use hanging file suspension system for desk drawers.

Another basic object is to provide a system of the character described that can be user-configured for desk drawers of different sizes.

A still further object is to provide a hanging file system that, once erected, is stable and rigid.

A related object is to provide a system of the character described that stays in alignment, and avoids jamming and binding.

Another object is to provide a hanging file folder suspension system that will not fall apart when removed from a drawer.

A similar object is to provide a hanging file system that prevents the support elements from dropping out when the system is lifted from the file drawer, so that the system may be removed from the drawer without first removing all the files.

Another object is to provide a hanging file system with resilient, user-installed corner fittings that align the frame members and brace the apparatus.

A still further object is to allow the frame to flex somewhat without collapsing, to readily accommodate hanging file folders of moderately varying dimensions.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
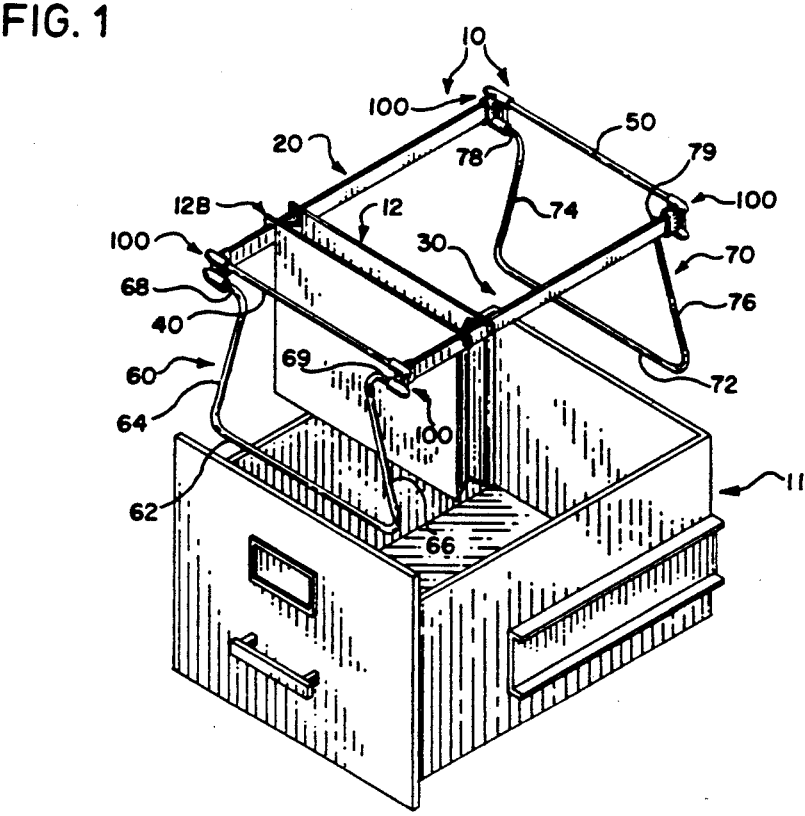
FIG. 1 is a partially exploded, isometric, pictorial view illustrating my filing frame in use.
Figure 2:
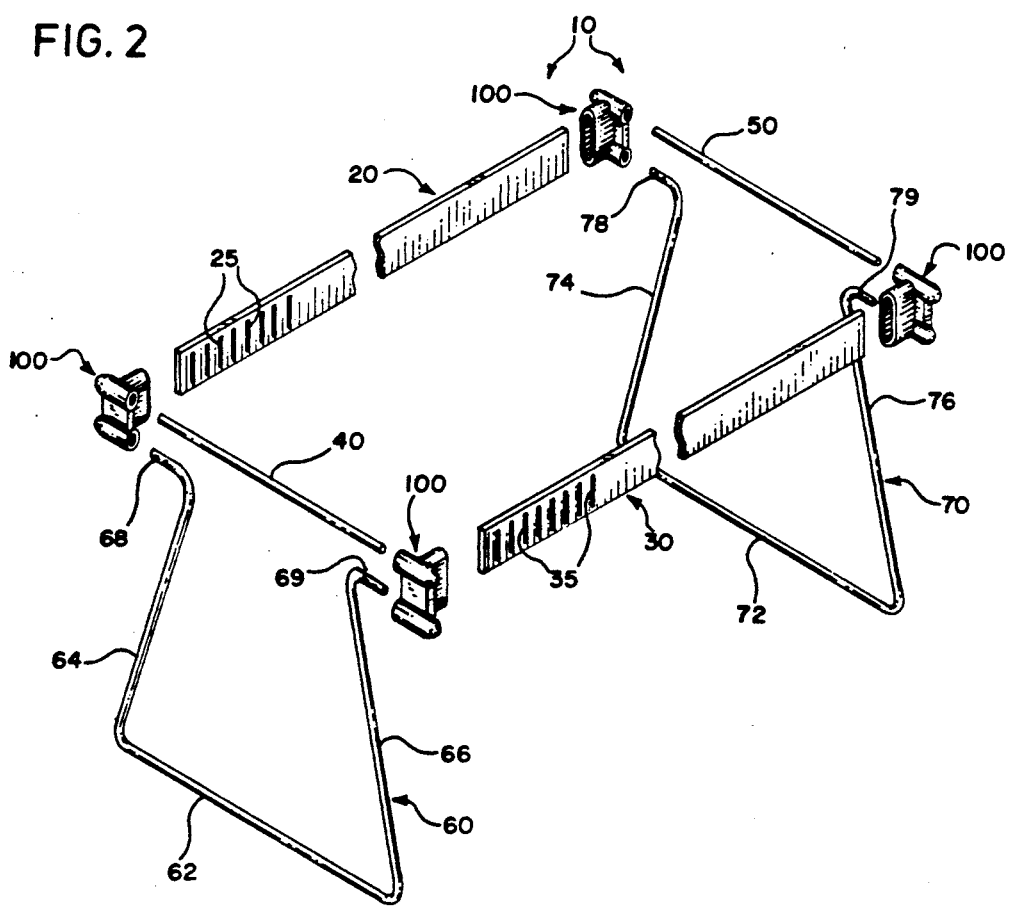
FIG. 2 is an enlarged, fragmentary, exploded, isometric view illustrating the individual parts and assembly of my filing frame system, with portions broken away for clarity.
Figure 3:
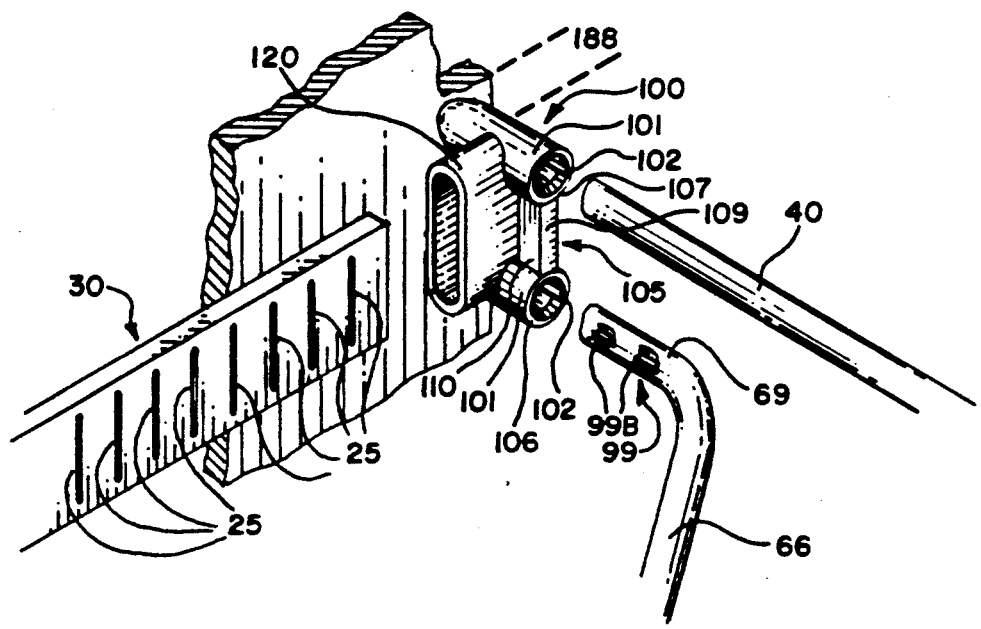
FIG. 3 is an enlarged, exploded, interior isometric view, taken from a position to the rear of the right front corner seen in FIG. 2, further illustrating component parts.

With initial reference directed to FIGS. 1 and 2 of the appended drawings, a preferred mode of my hanging file frame system is broadly designated by the reference numeral 10. System 10 may be snap fitted together from kit form as implied in FIG. 2, and it is adapted to be thereafter inserted into a conventional cabinet or desk drawer 11. The system supports a plurality of conventional hanging file folders 12, whose hooked ends 12B slidably engage the upper sides of the framework. It should be understood that system 10 may be adapted for use with drawers of different sizes (i.e., usually letter or legal sized drawers) by switching the corner supports to be discussed later.

With additional reference to FIGS. 3-6, the preferred hanging file frame system 10 generally comprises two elongated, spaced apart and parallel side rails 20 and 30 forming upper sides of the framework. Preferably two crossmember rods 40 and 50 extend in parallel, spaced apart relation to one another perpendicularly between the rails. The framework is supported by two hoops 60 and 70 at each end of the apparatus. Four modular joint supports 100 form the corners of the framework in the letter sized embodiment. Modular joint supports 200 discussed later can be used in the legal size embodiment. As seen in FIGS. 1 and 2 the elongated side rails 20 and 30 are joined to the crossmember rods 40 and 50 and the hoops 60 and 70 by the modular joint supports 100 or 200.

Figure 4:
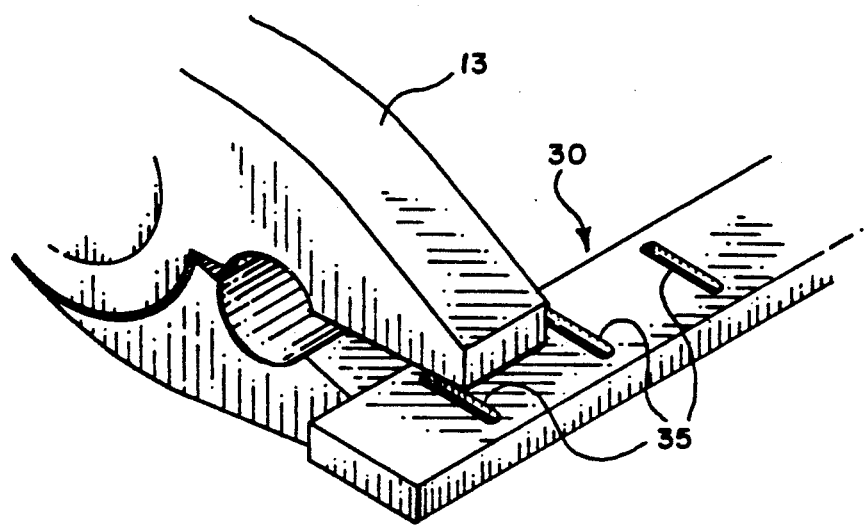
FIG. 4 is an enlarged, fragmentary, pictorial view illustrating the sizing of a side rail.
Figure 5:
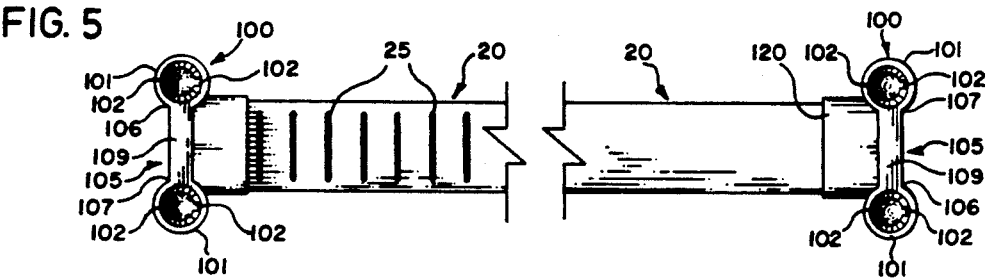
FIG. 5 is a fragmentary, side elevational view of one side of the system.
Figure 6:
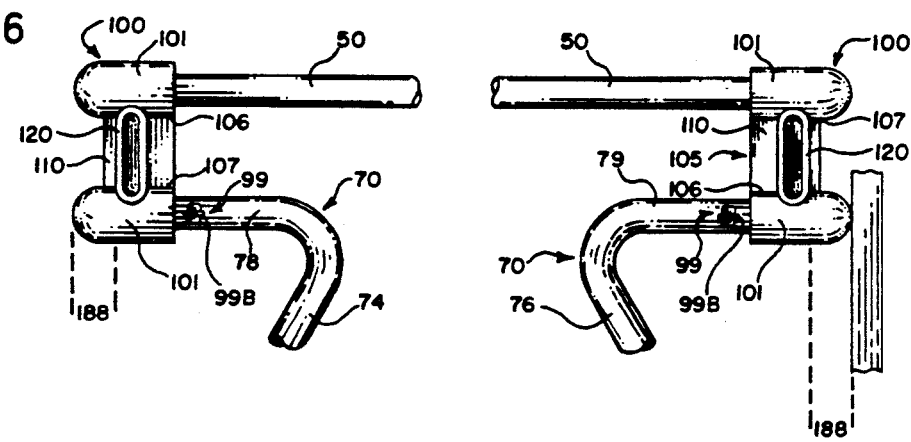
FIG. 6 is a fragmentary front elevational view of the system, primarily illustrating the assembly position of the crossmember rods and hoops.
Figure 7:
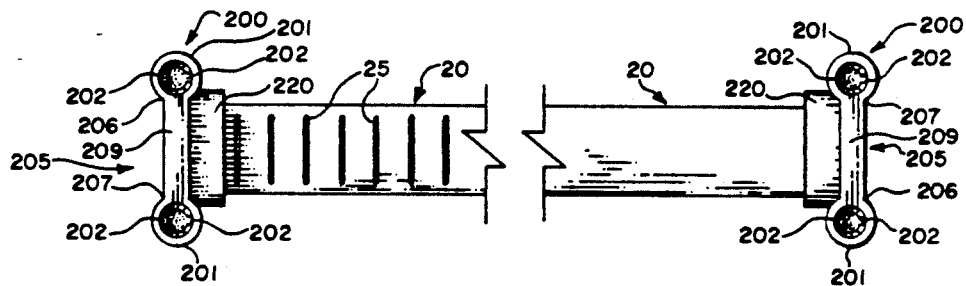
FIG. 7 is a fragmentary, side elevational view similar to FIG. 5, but illustrating legal size modular joint supports.

The elongated side rails 20 and 30 are made of relatively flat stock with a plurality of scores 25 and 35 near one end. These scores 25 and 35 allow the side rail length to be adjusted as necessary for a particular application. The length of these rails 20 and 30 is adjusted by breaking away a portion of the side rail 20 or 30 with a simple tool such as conventional pliers 13 (FIG. 4).

The crossmember rods 40 and 50 and the hoops 60 and 70 are formed from round bar stock of the same diameter. The crossmember rods 40 and 50 are simple pieces of round bar stock of a predetermined length.

Figure 8:
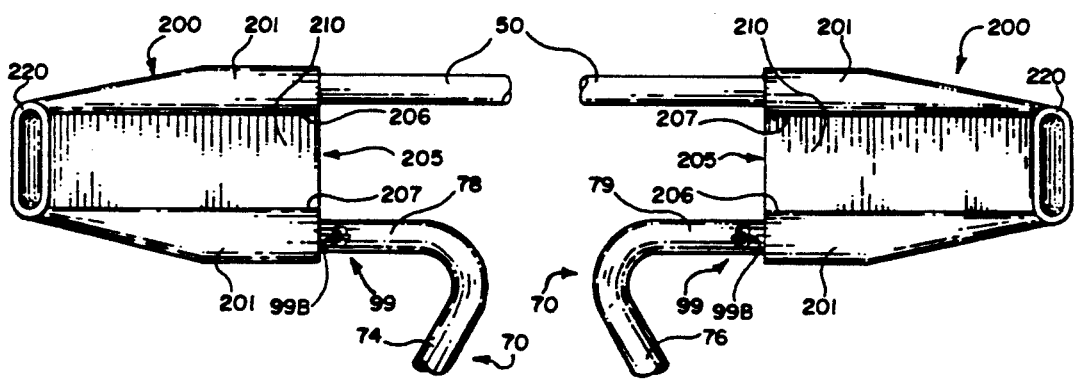
FIG. 8 is a view similar to FIG. 6 illustrating legal size joint supports.

The hoops 60 and 70, as indicated in FIGS. 1 and 2, are each bent from a single piece of stock. Each hoop comprises a foot 62 or 72, integral upright legs 64, 66, or 74, 76 at either end of the foot, and two horizontal tangs 68, 69, or 78 and 79. Since the foot is integral with the legs, system stability is enhanced. The outwardly bent tangs are oriented parallel with the crossmembers and the feet. Each tang includes a plurality of integral, spaced apart barbs 99 (FIGS. 3, 6, 8) formed from the material of the bar stock. The barbs 99 include offset, twisted body portions 99B aligned with the body of the cross members, and projecting outwardly somewhat from the surfaces of the metal.

Figure 9:
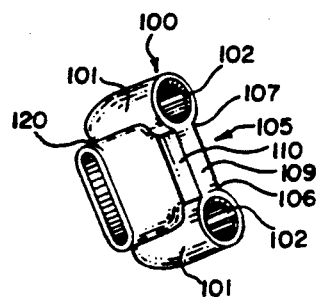
FIG. 9 is an enlarged, isometric view of the letter size modular joint support illustrating the interior of the minor bosses and the spatial relationship of the minor and major bosses.
Figure 10:
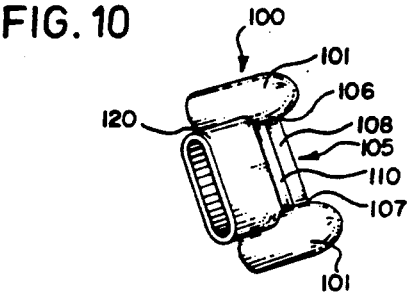
FIG. 10 is an isometric view of the letter size joint support illustrating the spatial relationship of the minor and major bosses, and showing an end opposite that of FIG. 9.
Figure 11:
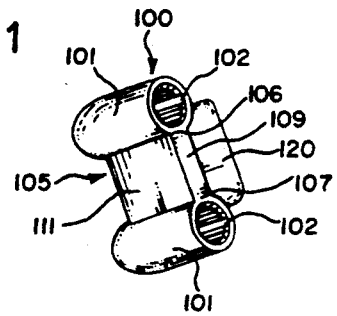
FIG. 11 is an isometric view of the letter size modular joint support taken generally from a position to the rear of FIG. 9.
Figure 12:
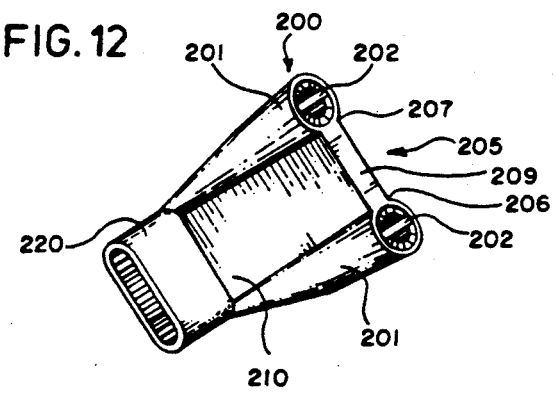
FIG. 12 is an enlarged isometric view similar to FIG. 9, but illustrating a legal size modular joint support.
Figure 13:
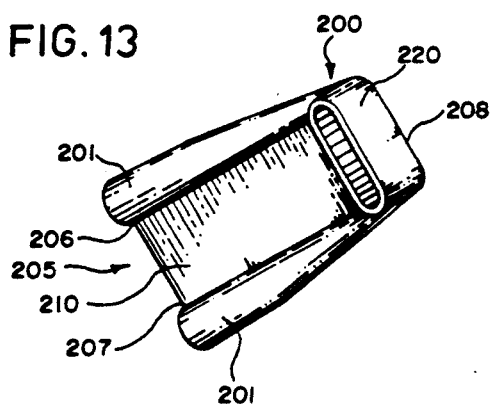
FIG. 13 is an isometric view similar to FIG. 10, but further illustrating the legal size modular joint support of FIG. 12; and, FIG. 14 is an isometric view, similar to FIG. 11, further illustrating the legal size modular joint support.
Figure 14:
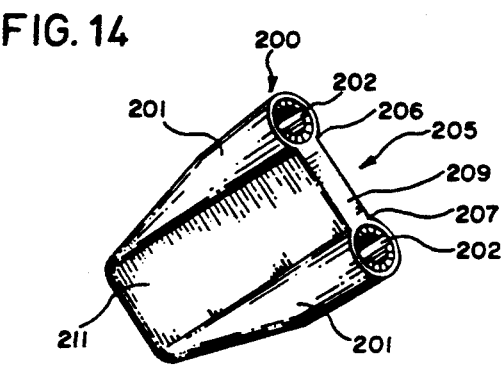

The modular joint supports 100 or 200 are interchangeable, and the length of the body 105 or 205 of the joint is dictated by the size of the files to be handled by the hanging file frame system 10. The smaller modular joint supports 100 illustrated in FIGS. 9-11 are used for file frame systems 10 that are intended for letter size files and therefore are narrower. For wider legal size drawers the system utilizes supports 200 illustrated in FIGS. 12-14. Both types of supports 100 or 200 have major features in common. Each comprises major bosses 120 or 220 and minor bosses 101 or 201 with keyways 102 or 202 disposed on the interior walls perpendicular to the central axes of the minor bosses 101 or 201. Preferably the modular joint supports 100 or 200 are constructed of a resilient but somewhat flexible plastic.

In detail the modular joint supports 100 or 200 as illustrated by FIGS. 9-14 primarily comprise a body 105 or 205 section comprising two ends 106 and 107 or 206 or 207, two edges 108 and 109 or 208 and 209 perpendicular to the ends 106 and 107 or 206 or 207 and two planar surfaces 110 and 111 or 210 and 211 defined by the ends 106 and 107 or 206 or 207 and the edges 108 and 109 or 208 and 209. A minor boss 101 or 201 is formed from each end 106 and 107 or 206 or 207 and an elongated major boss 120 or 220 is formed from one planar surface 110 or 210 of the body 105 or 205.

The body 105 or 205 of each support is generally rectangular in cross section. The length of this body 105 or 205 is determined by the size of the file frame system 10. The body 105 is relatively short for the letter frame systems 10, while the body 205 of the legal frame system supports 200 are relatively long.

As the body 105 or 205 reaches its ends 106 and 107 or 206 and 207 it expands outward to form minor bosses 101 or 201. Only one end of these bosses 101 or 201 is open, the other end is preferably closed. The position of the bosses 101 or 201 place them in a horizontal orientation whenever the hanging file frame system 10 is assembled. The bosses 101 or 201 have a bore diameter approximating the diameter of the smooth bar stock forming the crossmember rods 40 and 50 and the hoops 60 and 70. The minor bosses 101 or 201 are of a predetermined length. This length is the same in both the letter and legal size supports 100 or 200. Therefore, the minor bosses 201 of the legal support brackets are displaced toward the edge 209 most remote relative to the support's major boss 220.

Disposed on the internal wall of each minor boss 101 or 201 are two keyways 102 or 202. These keyways 102 or 202 run parallel with the central axis of the minor boss 101 or 201 but are disposed in a position perpendicular to the major boss 120 or 220 formed in the surface of the body 105 or 205. The barb portions 99B disposed on the hoop tangs register within the keyways 102 or 202 in the minor bosses 101 or 201. Therefore, when a tang is inserted into a minor boss it is locked, preventing rotation or inadvertent withdrawal.

The major boss 120 or 220 is disposed on a planar surface 110 or 210 of the body 105 or 205 perpendicular to the minor bosses 101 or 201 in two planes. This major boss 120 or 220 is oblong in shape. The interior being of a length approximating the width of the elongated side rails 20 and 30.

The legal size modular joint support 200 terminates in the major boss 220 at the edge 208 opposite the minor bosses 201. In the letter size modular joint support 100 the major boss 120 is disposed nearer the midpoint of the planar surface 110 of the support's body 105.

The letter size modular joint supports 100 provide an offset 188 between the side rails 20 and 30 and the wall of the drawer containing the system. The offset 188 allows conventional hanging file folders to slide freely on the side rails 20 and 30 of the system 10. This offset 188 is created by the minor boss 101 extending beyond the edge opposite the opening of the minor boss.

Assembly and Operation

First, the inside length of the file drawer is measured. Then the side rails are shortened by breaking away the excess length with a pair of pliers. Next, the corner joints are assembled. In assembly, each minor boss 101 or 201 has keyways 102 or 202 disposed on its interior boss walls, and the modular joint supports 100 or 200 are interchangeable. Therefore, to assemble the hanging file frame system 10, one simply inserts the tang 68, 69, or 78, 79 of a hoop into a modular joint support, the cross member into the other minor boss 101 or 201 and a side rail 20 or 30 into the major boss 120 or 220. The process is repeated for each corner. Finally, the frame system 10 is then placed within a file drawer. Numerous file folders may be then inserted, with their hook portions 12B (FIG. 1) able to freely slide along the rails.

Since the hoops 60 and 70 are fixed in the minor bosses they will not rotate or withdraw. Sagging is discouraged, but slight variance in system width is permitted by the orientation of the rails. When irregular file folders are suspended, the system thus accommodates minor variances in folder width, without binding or jamming. The system also tends to remain upright, and its orientation will be preserved even if the system is removed from the drawer with several hanging file folders upon it.

The generally horizontal orientation of the hoop's connection with the file frame structure provides the system a relatively large surface area, the dorsal area of the tang 68, 69, 78 or 79, on which to bear, thereby preventing breakage of the modular joint supports 101 or 201. In other words, by having at least a portion of the hoops oriented perpendicular between the rails (i.e., the tangs) system stability is enhanced. The above mentioned orientation has the further advantage of preventing the crossmembers or the hoop from simply dropping out when the system 10 is lifted from the file drawer. Since the hoop and crossmember are coplanar and form a plane substantially perpendicular to the rails, system stability is enhanced. Furthermore, the inherent elastic nature of the round bar stock of the hoops will allow the frame system 10 to flex without complete collapse.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A hanging file frame system adapted to be disposed within a drawer for slidably supporting a plurality of conventional, hooked hanging file folders, said system comprising:
    a pair of elongated rails adapted to be disposed in parallel, spaced apart relation within said drawer to form opposite upper sides of said system;
    a pair of crossmember rods adapted to be disposed in parallel spaced apart relation to each other within said drawer to brace said rails, said rods oriented generally perpendicularly with respect to said rails and forming transverse ends of said system;
    a pair of spaced apart hoops hanging portions projecting downwardly from said ends to contact a floor of said drawer to support and elevate said system, said hoops having outwardly projecting tangs substantially parallel with said rods, and,
    joint support means for rigidly establishing corners of said system, said joint support means perpendicularly joining said rods to said rails, perpendicularly joining said hoops to said rails, and maintaining said rods in spaced apart, generally coplanar relation with said downwardly projecting portions of said hoops.

2. The system as defined in claim 1 wherein said joint support means comprises four modular joint supports, each joint support comprising:
    a central, generally planar body comprising a pair of opposite ends, a pair of opposite edges perpendicular to said ends, and a pair of outer, planar surfaces bounded by said edges and said ends;
    a minor boss integrally formed on each end of said body for receiving at least a portion of said rods and for receiving said tangs, the minor bosses having aligned and parallel longitudinal axes and common open ends exposed on one edge of said body; and,
    a major boss integral with and perpendicular to said body extending outwardly from one of said planar surfaces for receiving ends of said rails, said major boss perpendicular to said longitudinal axes of said minor bosses.

3. The system as defined in claim 2 wherein said rails comprise a plurality of scores allowing the length of said rails to be shortened by breaking off a portion of said rail.

4. The system as defined in claim 3 wherein said hoops comprise a generally horizontal foot integrally extending between two upright legs, each leg terminating in said tangs, and said tangs adapted to penetrate minor bosses on opposite sides of said system.

5. The system as defined in claim 4 wherein said tangs comprise a plurality of barbs for frictionally locking within said minor bosses.

6. The system as defined in claim 5 wherein said minor bosses are keyed to fixedly align said hoops by registering with said barbs.

7. The system as defined in claim 6 wherein said modular joint supports are adapted to provide varying system widths by varying the length of the bodies of said joints.

8. The system as defined in claim 7 wherein said modular joint supports are adapted to provide a system width suitable for use with conventional legal size hanging file folders.

9. The system as defined in claim 7 wherein said modular joint supports are adapted to provide a system width suitable for use with conventional letter size hanging file folders.

10. The system as defined in claim 9 wherein said modular joint supports are adapted to contact a wall of said drawer to maintain a spaced relationship between said rail and said wall.

11. A kit enabling the custom construction of a hanging file frame system adapted to be disposed within a drawer for slidably supporting a plurality of conventional, hooked hanging file folders, said kit comprising:
    a pair of elongated rails adapted to be custom adjusted in length to fit said drawer to form opposite upper sides of said system;
    a pair of crossmember rods adapted to be disposed in parallel spaced apart relation to each other once assembled to brace said rails, said rods forming ends of said system;
    a pair of spaced apart hoops comprising tang portions generally parallel with said rods and downwardly projecting portions for supporting and elevating said system; and,
    joint support means for rigidly establishing corners of said system, said joint support means perpendicularly joining said rods to said rails to maintain the rails in parallel, spaced apart relation, and said joint support means perpendicularly joining said hoops to said rails and maintaining said rods in spaced apart, generally coplanar relation with said downwardly projecting portions of said hoops thereby forming a generally orthogonal system.

12. The kit as defined in claim 11 wherein said joint support means comprises four modular joint supports, each comprising:
   a central, generally planar body comprising a pair of opposite ends, a pair of opposite edges perpendicular to said ends, and a pair of outer, planar surfaces bounded by said edges and said ends;
   a minor boss integrally formed on each end of said body for fitting at least a portion of said rods and said tangs therein, the minor bosses having aligned and parallel longitudinal axes and common open ends exposed on one edge of said body; and,
   a major boss integral with and perpendicular to said body extending outwardly from one of said planar surfaces for snap fitting ends of said rails therein, said major boss perpendicular to said longitudinal axes of said minor bosses.

13. The kit as defined in claim 12 wherein said rails comprise a plurality of scores allowing the rails to be shortened by breaking off portions thereof.

14. The kit as defined in claim 13 wherein said hoops comprise a horizontal foot integrally extending between two generally vertical upright legs, each leg terminating in a horizontal tang adapted to penetrate said minor bosses.

15. The kit as defined in claim 14 wherein said tangs comprise a plurality of barbs for frictionally locking within said minor bosses.

16. The kit as defined in claim 15 wherein said minor bosses are keyed to fixedly align said hoops by registering with said barbs.

17. The kit as defined in claim 16 wherein said modular joint supports are adapted to provide varying system widths by varying the length of the bodies of said joints.

18. The kit as defined in claim 17 wherein said modular joint supports are adapted to provide a system width suitable for use with conventional legal size or letter size hanging file folders, and said modular joint supports are adapted to contact a wall of said drawer to maintain a spaced relationship between said rail and said wall.

19. The kit as defined in claim 11 wherein said joint support means comprises a first group comprising four modular joint supports for use in letter size file drawers and a second group comprising four modular joint supports for use in legal size drawers, each joint support comprising:
   a central, generally planar body comprising a pair of opposite ends, a pair of opposite edges perpendicular to said ends, and a pair of outer, planar surfaces bounded by said edges and said ends;
   a minor boss integrally formed on each end of said body for fitting at least a portion of said rods and said tangs therein, the minor bosses having aligned and parallel longitudinal axes and common open ends exposed on one edge of said body;
   a major boss integral with and perpendicular to said body extending outwardly from one of said planar surfaces for fitting ends of said rails therein, said major boss perpendicular to said longitudinal axes of said minor bosses; and,
   thereby providing a kit adaptable by the user for use as a legal size system or a letter size system.

20. A joint support for rigidly establishing corners of an orthogonal structural system, said joint support comprising:
   a central, generally planar body comprising a pair of opposite ends, a pair of opposite edges perpendicular to said ends, and a pair of outer, planar surfaces bounded by said edges and said ends;
   a minor boss integrally formed on each end of said body for receiving at least a portion of a pair of parallel structural members, the minor bosses having aligned and parallel longitudinal axes and the bosses having common open ends exposed on one edge of said body; and,
   a major boss integral with and perpendicular to said body extending outwardly from one of said planar surfaces for receiving a second structural member perpendicular to said first structural members, said major boss perpendicular to said longitudinal axes of said minor bosses.

* * * * *